(12) United States Patent
Eyb

(10) Patent No.: US 7,654,799 B2
(45) Date of Patent: Feb. 2, 2010

(54) MODULAR ROTOR BLADE FOR A WIND TURBINE AND METHOD FOR ASSEMBLING SAME

(75) Inventor: Enno Eyb, Osnabrück (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/380,936

(22) Filed: Apr. 30, 2006

(65) Prior Publication Data
US 2007/0253824 A1  Nov. 1, 2007

(51) Int. Cl.
F03D 11/00 (2006.01)

(52) U.S. Cl. .............. 416/229 R; 416/232; 29/889.71

(58) Field of Classification Search ........... 416/228, 416/239, 223 R, 142, 143, 229 R, 232; 403/109.1–109.8, 403/292–298, 359.1, 359.6, 383; 29/889.71
See application file for complete search history.

(56) References Cited

U.S. PATENT DOCUMENTS

| | | | | |
|---|---|---|---|---|
| 2,869,649 A | * | 1/1959 | Lux | 416/88 |
| 2,941,604 A | * | 6/1960 | Marriage | 416/142 |
| 4,389,162 A | * | 6/1983 | Doellinger et al. | 416/225 |
| 4,643,646 A | | 2/1987 | Hahn et al. | |
| 4,732,542 A | * | 3/1988 | Hahn et al. | 416/226 |
| 5,522,702 A | | 6/1996 | Kemsley et al. | |
| 5,839,882 A | | 11/1998 | Finn et al. | |
| 6,976,829 B2 | * | 12/2005 | Kovalsky et al. | 416/226 |
| 7,179,059 B2 | | 2/2007 | Sorensen et al. | |
| 7,186,086 B2 | * | 3/2007 | Yoshida | 416/146 R |
| 2004/0253114 A1 | * | 12/2004 | Gunneskov et al. | 416/224 |
| 2006/0243382 A1 | * | 11/2006 | Kilwin et al. | 156/285 |

FOREIGN PATENT DOCUMENTS

WO   WO 2006/002621 A1   1/2006

* cited by examiner

*Primary Examiner*—Ninh H Nguyen
(74) *Attorney, Agent, or Firm*—James McGinness, Esq.; Armstrong Teasdale LLP

(57) ABSTRACT

A sectional wind turbine rotor blade is provided, the sectional wind turbine rotor blade having first and second blade sections, wherein the first and second blade sections are fixedly mountable to each other via a connector. Furthermore, a method for assembling a sectional wind turbine rotor blade is provided.

12 Claims, 5 Drawing Sheets

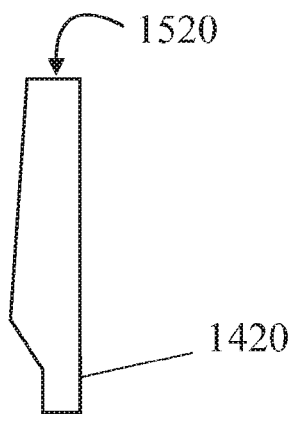
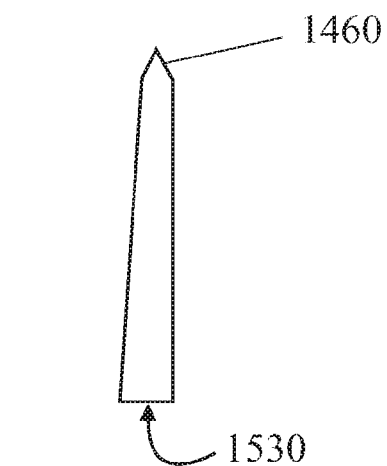
Fig. 5
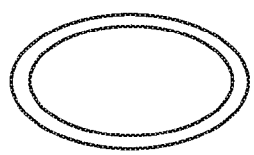
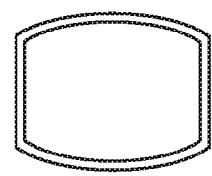
Fig. 6A          Fig. 6B          Fig. 6C

MODULAR ROTOR BLADE FOR A WIND TURBINE AND METHOD FOR ASSEMBLING SAME

FIELD OF THE INVENTION

The present invention relates to a modular rotor blade for a wind turbine and a method for assembling such a modular rotor blade.

BACKGROUND OF THE INVENTION

In recent years, wind turbines have become more and more important in power generation. As a result, more and more wind turbines are installed. Since the number of profitable sites for wind energy production is limited, there is a tendency to increase the installed power per turbine. Since the installed power is proportional to the diameter of the turbine rotor, the rotor sizes and, accordingly, the turbine sizes increase. As a result, the length of the wind turbine rotor blades increases more and more. Typical blade lengths of current turbine designs are up to 70 meters or more.

When assembling a wind turbine, the rotor blades have to be transported to the construction site by trucks on normal roads. Aside from the insufficient maneuverability of a vehicle transporting a 70 meter rotor blade, road transportation of rotor blades with 70 meters or more is extremely costly. Furthermore, specific routes for the transport have to be followed since narrow curves cannot be passed. Also loading and unloading of very long rotor blades from the truck is difficult. Additionally, sometimes rotor blades have to be transported also by ship or even by means of helicopters.

BRIEF DESCRIPTION OF THE INVENTION

In view of the above, a modular rotor blade for a wind turbine is provided. The modular rotor blade comprises at least a first module and a second module, wherein the first and second modules are adapted to be rigidly fixed to each other by a connection arrangement. Furthermore, a method for assembling a sectional wind turbine blade is provided, wherein the method comprises the steps of providing a sectional wind turbine rotor blade having first and second blade sections, fitting together the blade sections by means of a connector, and forming a permanent joint between the first and second sections.

Further aspects, advantages and features of the present invention are apparent from the dependent claims, the description and the accompanying drawings.

According to a first embodiment of the present invention, a sectional wind turbine rotor blade having first and second blade sections is provided. The first and second blade sections are fixedly mountable to each other by means of a connector. Due to the modular design of the rotor blade, the overall length of the sections to be transported is reduced compared to the longitudinal length of a non-modular rotor blade. Thus, transportation costs are considerably reduced. The provision of a connector has only a relatively low impact on blade structure and weight so that the operational properties of the rotor blade are not deteriorated.

According to a further embodiment of the present invention, the connector includes a connector rod and a receptacle adapted to receive the rod. For example, the connector rod and the receptacle may be formed by male and female box beams which are adapted to fit into each other. The rod may be provided at a respective blade section or may be provided as a separate part. In the first case, a receptacle will be provided at the fitting module whereas, in the letter case, receptacles will be provided at the modules to be joined and the separate connector can be inserted in both receptacles. Such a plug and socket connection allows easy assembly of the blade modules at the construction site.

According to a further embodiment of the present invention, the permanent joint between two adjacent rotor blade sections is formed by vacuum infusion. Thus, a firm but flexible connection between the blade sections is established. Furthermore, vacuum infusion allows using fiber-reinforced materials for the connector. Typically, such materials are compatible with the blade shell material.

According to another aspect of the present invention, a method for assembling a sectional wind turbine blade is provided, wherein the method comprises the steps of providing a modular wind turbine rotor blade with at least two modules, joining the modules by means of a connector, and establishing a permanent connection between the modules.

According to an even further embodiment of the present invention, the permanent connection between the modules is formed by vacuum infusion. This allows easy assembly and joining of the rotor blade modules.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIG. 5 shows an even further embodiment of a sectional wind turbine rotor blade.

FIGS. 6A to 6C show different cross-sectional shapes of a connector utilized in an embodiment of the present invention.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
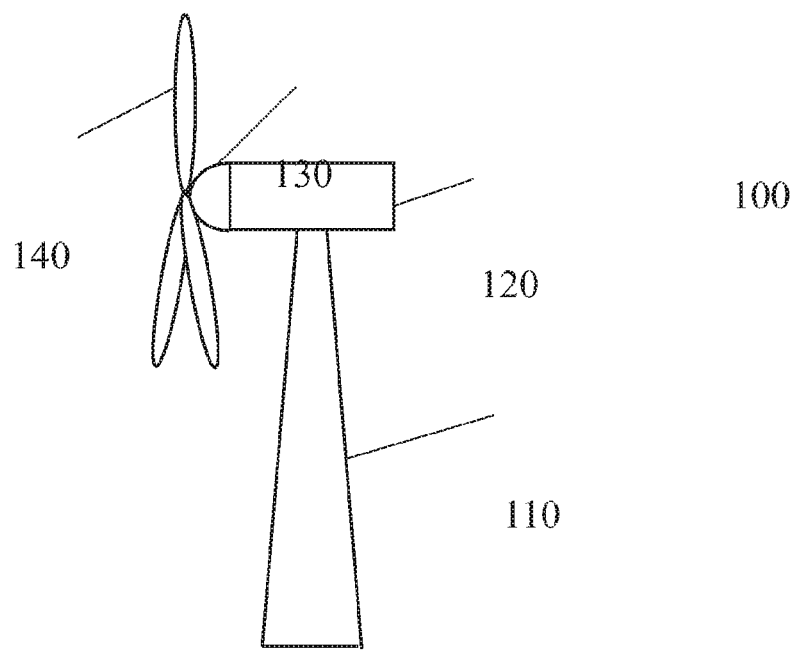
FIG. 1 shows a wind turbine according to an embodiment of the present invention.

FIG. 1 shows a wind turbine 100 according to an embodiment of the present invention. The wind turbine 100 includes a tower 110, typically made of steel, to which a nacelle 120 is mounted. A rotor hub 130 is mounted to a lateral end of nacelle 120. Rotor blades 140 are mounted to rotor hub 130.

Figure 2:
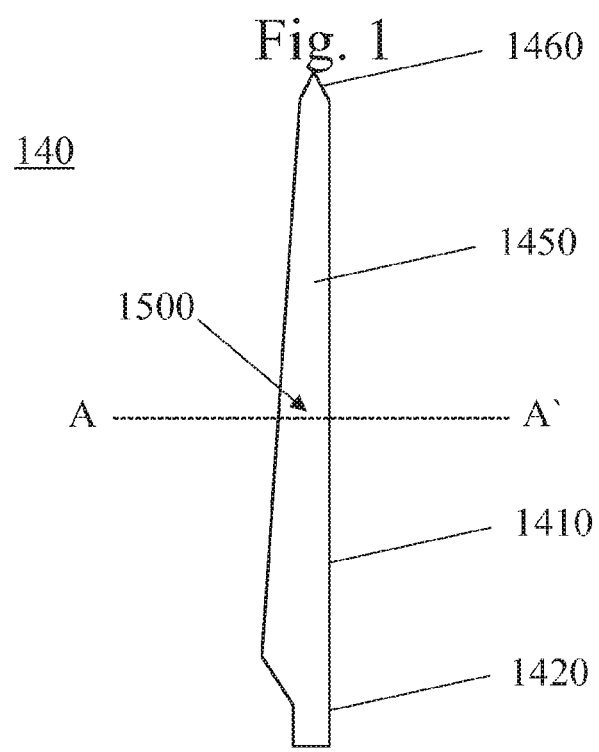
FIG. 2 shows a rotor blade according to an embodiment of the present invention.

FIG. 2 shows a rotor blade 140 according to an embodiment of the present invention. Rotor blade 140 includes a first module 1410 and a second module 1450 which are joined together at a connection portion 1500. In the embodiment shown in FIG. 2, the first module 1410 includes a root section 1420 of the rotor blade and the second module 1450 includes a tip 1460 of the rotor blade. A permanent joint between the first and second modules 1410, 1450 is formed within connection portion 1500 along line A-A'.

Figure 3:
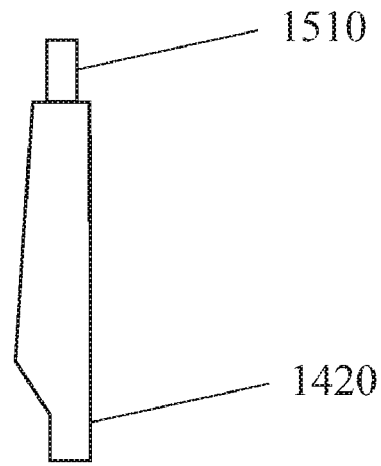
FIG. 3 shows a first embodiment of a sectional rotor blade according to the present invention.
Figure 3:
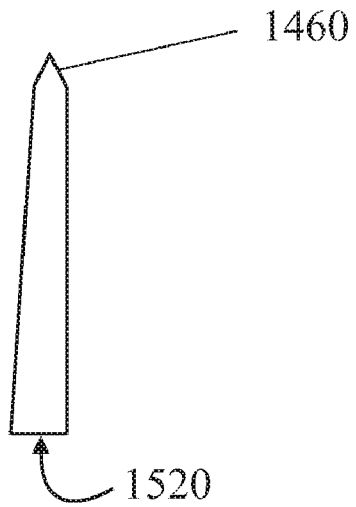

FIG. 3 shows a first embodiment of a sectional rotor blade according to the present invention. On the left hand side of FIG. 3, a first module 1410 is shown. At its lower end side, first module 1410 includes a root portion 1420 for mounting the rotor blade to the hub 130 of the wind turbine. At its opposite end, when seen in a longitudinal direction of the rotor blade, first module 1410 includes a connector 1510. According to the present embodiment connector 1510 is formed as a connector rod. For example, connector rod 1510 may be formed as a box beam, e.g. within a spar web or as an extension of a spar web. On the right-hand side of FIG. 3, a second module 1450 including a tip end side 1460 of the rotor blade is shown. Opposite to the tip end side 1460, second module 1450 includes a receptacle 1520. For example, receptacle 1520 may be formed as a box beam, e.g. within a spar web.

Figure 4:
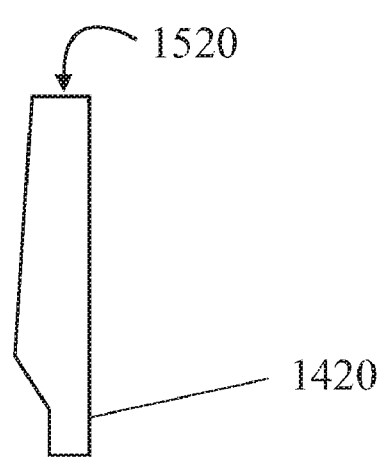
FIG. 4 shows a modular wind turbine rotor blade according to another embodiment of the present invention.
Figure 4:
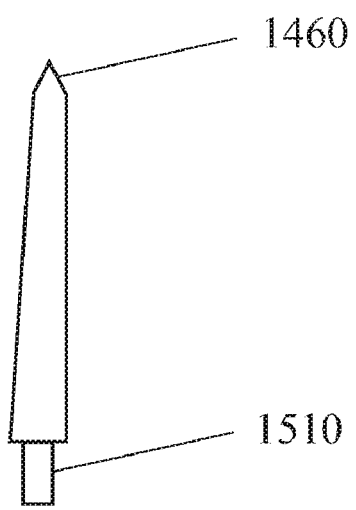

FIG. 4 shows a modular wind turbine rotor blade according to another embodiment of the present invention. According to this embodiment, a receptacle 1520 is disposed at the first module 1410 opposite to the root end 1420. As shown on the right hand side of FIG. 4, a connector rod 1510 is provided at the second module 1450. Connector rod 1510 is disposed opposite to tip end side 1460 of the second module 1450. In other words, in the embodiment shown in FIG. 4 the positions of the connector 1510 and the receptacle 1520 are interchanged with respect to the embodiment shown in FIG. 3.

An even further embodiment of a sectional wind turbine rotor blade is shown in FIG. 5. Therein, a first receptacle 1520 is disposed at a first module 1410 opposite to the blade root 1420. A second receptacle 1530 is disposed at a second module 1450 opposite to the tip end 1460. Furthermore, a connector 1510 is provided as a separate piece. Separate connector 1510 may be inserted into both receptacles 1520, 1530 to form a connection between the first and second modules 1410, 1450.

In any of the embodiments shown in FIGS. 3, 4 and 5, the receptacles 1520, 1530 are adapted to fit with a connector 1510. In particular, the cross-sectional shapes of the receptacles 1520, 1530 and the connector 1510 are similar or identical with respect to each other so that the connector 1510 fits into the receptacles 1520, 1530. Typically, connector 1510 and receptacles 1520, 1530 are closely fitting so that only a small cavity is allowed between connector 1510 and receptacles 1520, 1530. It has been described above that connector 1510 is disposed inside the receptacles 1520, 1530. However, it should be understood that an inverse configuration may also be chosen, i.e. that beam-like extensions are provided at the first and second modules 1410, 1450 which fit into a hollow connector 1510. In other words, connector 1510 acts like a bushing or sleeve in this case.

Typical cross-sectional shapes of connector 1510 are shown in FIGS. 6A to 6C. FIG. 6A shows a connector 1510 having a rectangular cross-section. It should be understood that also a square cross-section is comprised within the meaning of the term 'rectangular'. According to another embodiment of the present invention shown in FIG. 6B, the connector has an elliptical cross-section. It should be understood that also a circular cross-section is comprised within the meaning of the term 'elliptical'. An even further embodiment of the present invention is shown in FIG. 6C. Therein, the cross-sectional shape of connector 1510 is adjusted to the cross-sectional shape of the wind turbine rotor blade 140. The cross-sectional shape is basically rectangular but the upper and lower connecting surfaces are curved so as to follow the shape of the blade shells. Although FIGS. 6A to 6C show the cross-sectional shape of connector 1510, it should be understood that the cross-sectional shapes of receptacles 1520, 1530 will be selected to correspond with the cross-sectional shape of connector 1510. Thus, during a vacuum infusion process uniform distribution of resin between the connector 1510 and the receptacles 1520, 1530 can be guaranteed. As a result, a uniform bond line is formed between the connector and the receptacles by such an infusion process. Thus, uniform load distribution within the bonding connection between the first and second modules is established.

Figure 7:
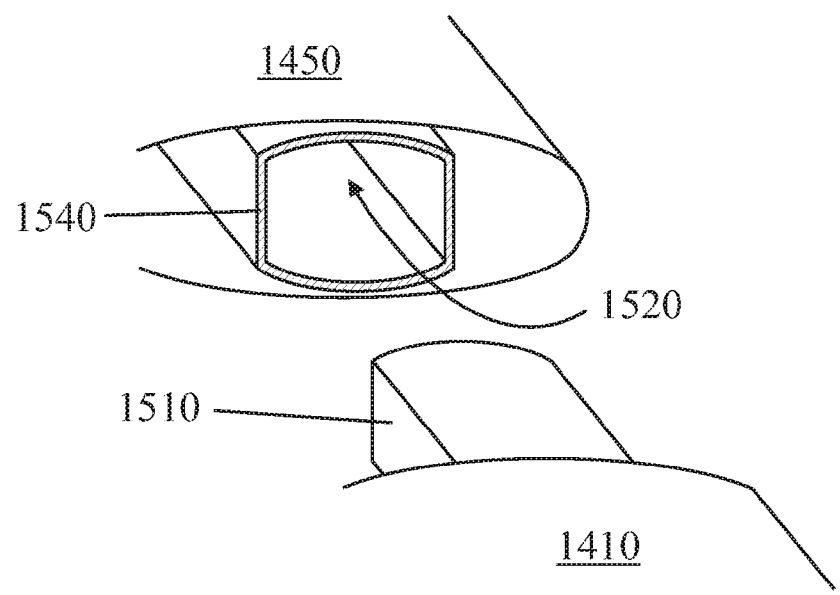
FIG. 7 shows a perspective view of a connection portion according to an embodiment of the present invention.

FIG. 7 shows a perspective view of connection portion 1500. Therein, connector 1510 is disposed at the first module 1410 whereas receptacle 1520 is disposed at the second module 1450. Thus, the embodiment shown in FIG. 7 corresponds to the embodiment shown in FIG. 3. Furthermore, the cross-sectional shape of connector 1510 and receptacle 1520 is adapted to the shape of the rotor blade shells, thus corresponding to the embodiment shown in FIG. 6c. Receptacle 1520 further includes a sealing flange 1540. A similar corresponding sealing flange (not shown) or a bulkhead may be provided at connector 1510. The sealing flanges 1540 and/or bulkheads serve to seal the cavity between the connector 1510 and the receptacle 1520 during vacuum infusion.

Figure 8:
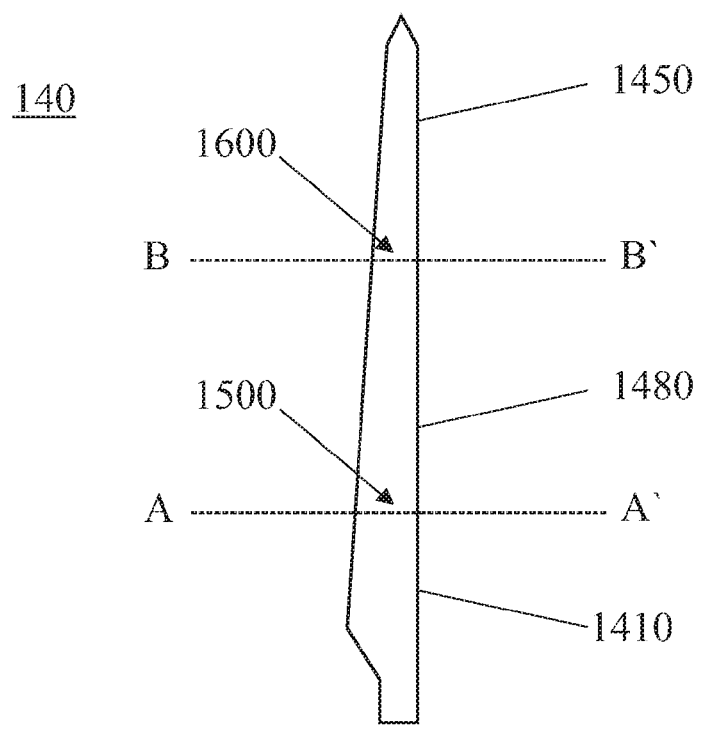
FIG. 8 shows a rotor blade according to a further embodiment of the present invention.

FIG. 8 shows a further embodiment of the present invention. Therein, an intermediate blade section 1480 is disposed between a root end blade section 1410 and a tip end blade section 1450. Accordingly, a first connection portion 1500 is formed along line A-A' between the root end section 1410 and the intermediate section 1480 and a second connection portion 1600 along line B-B' is formed between intermediate section 1480 and tip end section 1450. The connections 1500, 1600 between the blade sections 1410, 1450, 1480 can be formed according to any of the embodiments described above. In particular, connector rods 1510 may be provided at one or both ends of intermediate section 1480. Alternatively, receptacles 1520, 1530 may be provided at one or both ends of intermediate section 1480. Furthermore, it should be understood that even more than only one intermediate section 1480 may be provided between the root and tip end sections 1410, 1450. Thus, the maximum longitudinal length of the blade sections 1410, 1450, 1480 to be transported can be limited to a desired and/or optimum length. The optimum length may be optimized with respect to transportation costs, assembly costs and structural integrity.

According to another embodiment of the present invention, the longitudinal length of the blade sections, i.e. the length of the sections when seen from the root to the tip of the rotor blade, is chosen to be essentially equal. In this context, the term 'essentially' means that the longitudinal length is not required to be exactly equal but to be similar. Thus, the length of the blade sections is optimized with respect to transportation requirements in that sections of essentially same length are provided.

Figure 9:
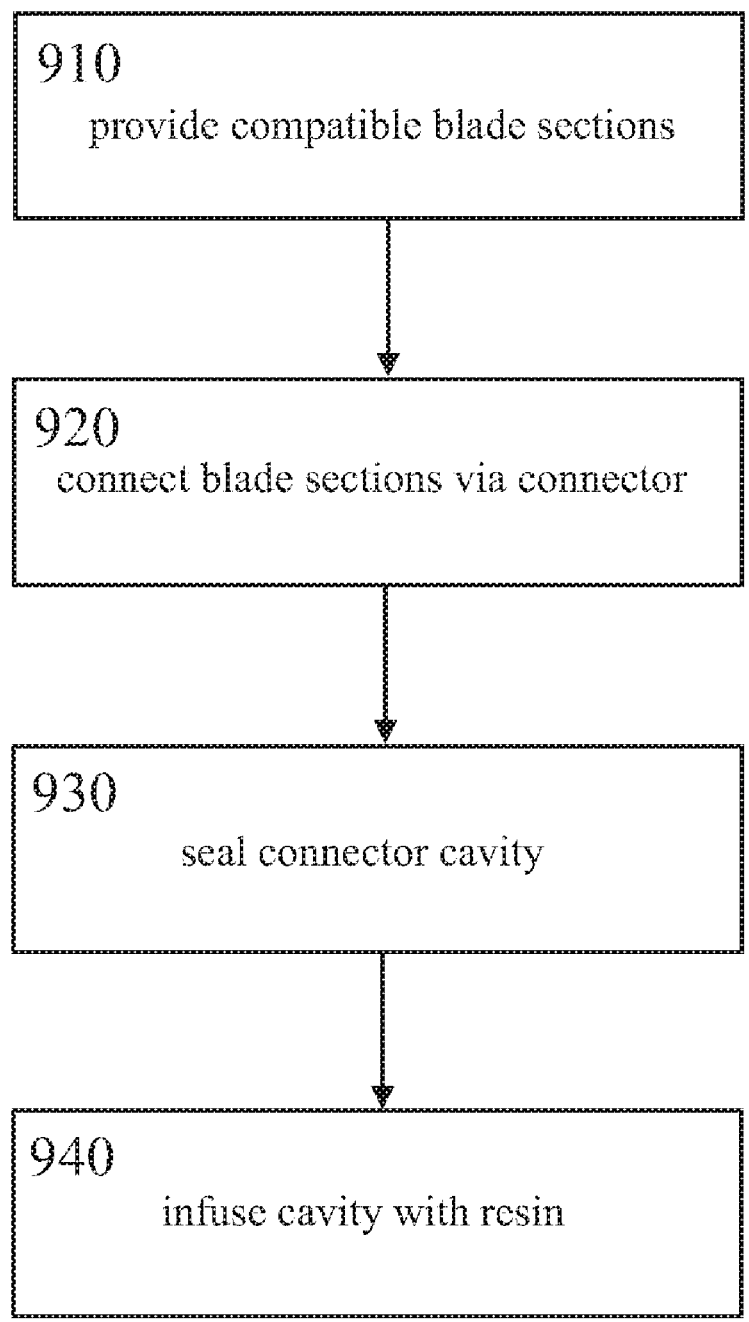
FIG. 9 shows a flow chart of an assembly method according to another aspect of the present invention.

Next, a method for assembling a sectional blade is described with reference to FIG. 9. According to a first method step 910, a sectional rotor blade is provided, e.g. compatible sections of a rotor blade are transported to a construction site. In a second step 920, the rotor blade sections 1410, 1450 are fit together by means of a connector 1510. For example, connector 1510 is formed as a box beam at the first blade section 1410. A corresponding receptacle 1520 is formed at the second blade section 1450. Connector 1510 is inserted into receptacle 1520, thus fitting first and second blade sections 1410, 1450 together. In a further step 930, the cavity between the connector 1510 and the receptacle 1520 is sealed. For large blades, this can be done from inside the blade. For example, a worker may access the connecting portion 1500 via the blade root 1420. Typically, also a bulkhead and/or sealing flanges 1540 are provided at the connector 1510 and/or the receptacle 1520 to facilitate the sealing of the cavity. After the cavity between connector 1510 and receptacle 1520 is sealed, resin is infused into the cavity by vacuum infusion (step 940). For this purpose, conventional vacuum-infusion methods can be used. Such vacuum-infusion methods are well-known in the art. After the infused resin has cured, a permanent joint between the first and second sections 1410, 1450 is formed. The bonded joint 1500 between the first and second sections fulfills the requirements with respect to mechanical stability and structural integrity without need of any further fastening means. Thus, a reliable mechanical connection between the first and second rotor blade sections can be easily established at a construction site of the wind turbine.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

The invention claimed is:

1. A modular rotor blade for a wind turbine, comprising at least a first module and a second module, wherein the first and second modules are adapted to be rigidly fixed to each other by a connection arrangement, the connection arrangement comprising a connector rod bonded to at least one receptacle adapted to receive the connector rod, the connector rod and the at least one receptacle forming a sealing flange, wherein the connector rod and the at least one receptacle have rectangular cross sections, and wherein a permanent bonding joint defined between the first and second modules comprises a substantially uniform bond line inducing a substantially uniform load distribution between the connector rod and the at least one receptacle.

2. The modular rotor blade according to claim 1, wherein the connector rod is disposed at the first module.

3. The modular rotor blade according to claim 1, wherein the connector rod is disposed at the second module.

4. The modular rotor blade according to claim 1, wherein the receptacle is disposed at the first module.

5. The modular rotor blade according to claim 1, wherein the receptacle is disposed at the second module.

6. The modular rotor blade according to claim 1, wherein each module has essentially the same longitudinal length.

7. The modular rotor blade according to claim 1, further comprising at least one intermediate module, the intermediate module being adapted to be rigidly fixed to one of the first and second modules by a connection arrangement, the connection arrangement comprising a second connector rod bonded to at least one second receptacle adapted to receive the connector rod, and wherein the second connector rod and the at least one second receptacle have rectangular cross sections.

8. The modular rotor blade according to claim 1, wherein the connector rod and the receptacle are male and female box beams adapted to fit into each other.

9. The modular rotor blade according to claim 8, wherein the box beams comprise sealing flanges.

10. A modular rotor blade for a wind turbine, comprising at least a first module and a second module, wherein the first and second modules are adapted to be rigidly fixed to each other by a connection arrangement, the connection arrangement comprising a connector rod bonded to at least one receptacle adapted to receive the connector rod, the connector rod and the at least one receptacle forming a sealing flange, wherein the connector rod and the at least one receptacle have an elliptical cross section, and wherein a permanent bonding joint defined between the first and second modules comprises a substantially uniform bond line inducing a substantially uniform load distribution between the connector rod and the at least one receptacle.

11. A method for assembling a sectional wind turbine blade, said method comprising:
    providing a sectional wind turbine rotor blade having a first blade section and a second blade section;
    fitting together the first and second blade sections with a connector;
    forming a permanent joint between the first and second blade sections by:
        sealing the connector; and
        forming a permanent, substantially uniform bonding joint between a connector rod and at least one receptacle inducing a substantially uniform load distribution between the connector rod and the at least one receptacle, the connector rod and the at least one receptacle forming a sealing flange.

12. The method according to claim 11, wherein the permanent joint is formed with a uniform bond line.

* * * * *